United States Patent
Horiguchi et al.

(10) Patent No.: US 9,573,351 B2
(45) Date of Patent: Feb. 21, 2017

(54) SHEET STICKING APPARATUS AND SHEET STICKING METHOD

(75) Inventors: Yohei Horiguchi, Tokyo (JP); Kosaku Takahashi, Machida (JP)

(73) Assignee: LINTEC CORPORATION, Tokyo (JP)

( * ) Notice: Subject to any disclaimer, the term of this patent is extended or adjusted under 35 U.S.C. 154(b) by 556 days.

(21) Appl. No.: 14/125,536

(22) PCT Filed: Jun. 11, 2012

(86) PCT No.: PCT/JP2012/064886
§ 371 (c)(1),
(2), (4) Date: Dec. 11, 2013

(87) PCT Pub. No.: WO2013/005530
PCT Pub. Date: Jan. 10, 2013

(65) Prior Publication Data
US 2014/0110041 A1    Apr. 24, 2014

(30) Foreign Application Priority Data

Jul. 1, 2011 (JP) .................................. 2011-147184

(51) Int. Cl.
*B32B 37/00*  (2006.01)
*B65C 1/04*  (2006.01)
(Continued)

(52) U.S. Cl.
CPC ....... *B32B 37/0046* (2013.01); *B29C 63/0073* (2013.01); *B29C 63/16* (2013.01);
(Continued)

(58) Field of Classification Search
CPC .. B32B 37/0046; B29C 63/0073; B29C 66/16; B65C 1/04; B65C 1/045; B65C 9/36
(Continued)

(56) References Cited

U.S. PATENT DOCUMENTS 3,873,395 A * 3/1975 Ehrlich ................... B27D 3/00
                                                  100/211
5,460,681 A * 10/1995 Horner ................ B29C 63/0013
                                                  156/183
(Continued)

FOREIGN PATENT DOCUMENTS

DE   3309535 A1   12/1983
EP   2272767 B1   6/2012
(Continued)

OTHER PUBLICATIONS

International Search Report dated Aug. 7, 2012, issued in corresponding application No. PCT/JP2012/064886.

*Primary Examiner* — James Sells
(74) *Attorney, Agent, or Firm* — Westerman, Hattori, Daniels & Adrian, LLP

(57) ABSTRACT

A sheet sticking apparatus 10 includes holding means 13 provided so as to be capable of holding an adhesive sheet S, and sticking means 12 that sticks the adhesive sheet S to an adherend surface W0 of an adherend W. The sticking means 12 includes a first sticking portion 15 capable of sticking a part of the adhesive sheet S held by the holding means 13 to a first sticking surface by pressure, and a second sticking portion 16 that sticks portions of the adhesive sheet S that have not yet been stuck by using the first sticking portion 15 to second sticking surfaces by pressure.

5 Claims, 5 Drawing Sheets

(51) Int. Cl.
*B65C 9/36* (2006.01)
*B29C 63/16* (2006.01)
*B29C 63/00* (2006.01)

(52) U.S. Cl.
CPC ............ *B65C 1/04* (2013.01); *B65C 1/045* (2013.01); *B65C 9/36* (2013.01); *B29C 63/0047* (2013.01); *Y10T 156/10* (2015.01); *Y10T 156/1051* (2015.01); *Y10T 156/17* (2015.01)

(58) Field of Classification Search
USPC ............ 156/230, 538, 539, 540, 556, 580, 581,156/583.1
See application file for complete search history.

(56) References Cited

U.S. PATENT DOCUMENTS 7,963,311 B2 * 6/2011 Perttila .................. B27D 3/00
156/580
2007/0102109 A1 5/2007 Katritzky et al.

FOREIGN PATENT DOCUMENTS

| | | |
|---|---|---|
| GB | 1365873 A | 9/1974 |
| JP | 06-286928 A | 10/1994 |
| JP | 09-002438 A | 1/1997 |
| JP | 2007-217043 A | 8/2007 |
| WO | 2005/120961 A1 | 12/2005 |

* cited by examiner

SHEET STICKING APPARATUS AND SHEET STICKING METHOD

FIELD OF THE INVENTION

The present invention relates to a sheet sticking apparatus and a sheet sticking method capable of sticking an adhesive sheet to an adherend surface.

BACKGROUND OF THE ART

Conventionally, there has been used a sheet sticking apparatus that sticks an adhesive sheet to a non-flat adherend surface. Such a sheet sticking apparatus is disclosed in, for example, Patent document 1. The sheet sticking apparatus disclosed in Patent document 1 includes an elastic member that can elastically deform depending on the shape of the adherend surface of adherends while an adhesive sheet such as a label is held, and is configured to apply a pressing force to the adhesive sheet while deforming the elastic member when sticking the adhesive sheet.
[Patent Document 1]
Japanese Patent Application Laid-Open No. 6-286928.

SUMMARY OF THE INVENTION

Problem to be Solved by the Invention

However, there is such a disadvantage that in the sticking apparatus disclosed in Patent document 1, as shown in FIG. 7, an elastic member 50 cannot sufficiently apply a pressing force to an end region of an adhesive sheet S, outside a protrusion portion WA of an adherend W, even when the adhesive sheet S is pressed with the elastic member 50, and therefore the end region of the adhesive sheet S is not stuck to a side W4, this leaving a portion of the sheet that has not yet been stuck.

Object of the Invention

It is an object of the present invention to provide a sheet sticking apparatus and a sheet sticking method which can prevent any portion of an adhesive sheet that has not yet been stuck from being left.

Means for Solving Problems

In order to achieve the above object, the present invention adopts such an arrangement that a sheet sticking apparatus for sticking an adhesive sheet to an adherend surface having a first sticking surface and second sticking surfaces, the adhesive sheet including an adhesive layer on one surface of a base sheet, the apparatus comprising:
holding means provided so as to be capable of holding the adhesive sheet; and sticking means that sticks the adhesive sheet to the adherend surface by pressure,
wherein the sticking means includes a first sticking portion capable of sticking a part of the adhesive sheet held by the holding means to the first sticking surface by pressure, and a second sticking portion capable of sticking portions of the adhesive sheet that have not yet been stuck by using the first sticking portion to the second sticking surfaces by pressure.
The present invention preferably adopts such an arrangement that the adhesive sheet has a release liner temporarily stuck to the adhesive layer,
the holding means is provided so as to be capable of holding the adhesive sheet in a state in which the release liner is partially peeled off.
Also, such an arrangement is preferably adopted that the second sticking portion is provided so as to be capable of sticking the adhesive sheet to the second sticking surfaces by pressure, while gradually peeling off the release liner that have been partially peeled off from the adhesive sheet.
Furthermore, such an arrangement may be adopted that the holding means comprises creasing portions for creasing the release liner temporarily stuck to the held adhesive sheet by folding the release liner.
Also, a sheet sticking method according to the present invention adopts a sheet sticking method for sticking an adhesive sheet to an adherend surface having a first sticking surface and second sticking surfaces, the adhesive sheet including an adhesive layer on one surface of a base sheet, the method comprising the steps of:
holding the adhesive sheet;
sticking a part of the held adhesive sheet to the first sticking surface by pressure; and
sticking portions of the adhesive sheet that have not yet been stuck in the preceding step to the second sticking surfaces by pressure.

Effects of the Invention

According to the present invention, after a part of an adhesive sheet is stuck to the first sticking surface by pressure using the first sticking portion, portions of the adhesive sheet that have not yet been stuck can be stuck to the second sticking surfaces by pressure using the second sticking portion. Therefore, even when the regions that have not yet been stuck are left in the adhesive sheet by sticking using first sticking portion, such regions can be stuck using the second sticking portion, this preventing any portion that has not yet been stuck from being left.
Also, the holding means can be held the adhesive sheet in a state in which a release liner is partially peeled off, and therefore this increases aspects of the adhesive sheet to be stuck, and enhances the versatility thereof. Furthermore, since sticking can be performed while the release liner are peeled off using the second sticking portion, sticking of the adhesive sheet to any unintended site can be avoided before sticking using the second sticking portion. This can prevent the occurrence of poor sticking in which the adhesive sheet is wrinkled and air bubbles are trapped between the adhesive sheet and the adherend.
Moreover, in the case of the holding means having the creasing portions, creasing of the release liner can be performed easily and in a short time; and peeling off of the release liner and thus sticking of the adhesive sheet while keeping a folding position constant can be stably performed.

DESCRIPTION OF THE PREFERRED EMBODIMENTS

The embodiment of the present invention will be described below with reference to the drawings.

Figure 1:
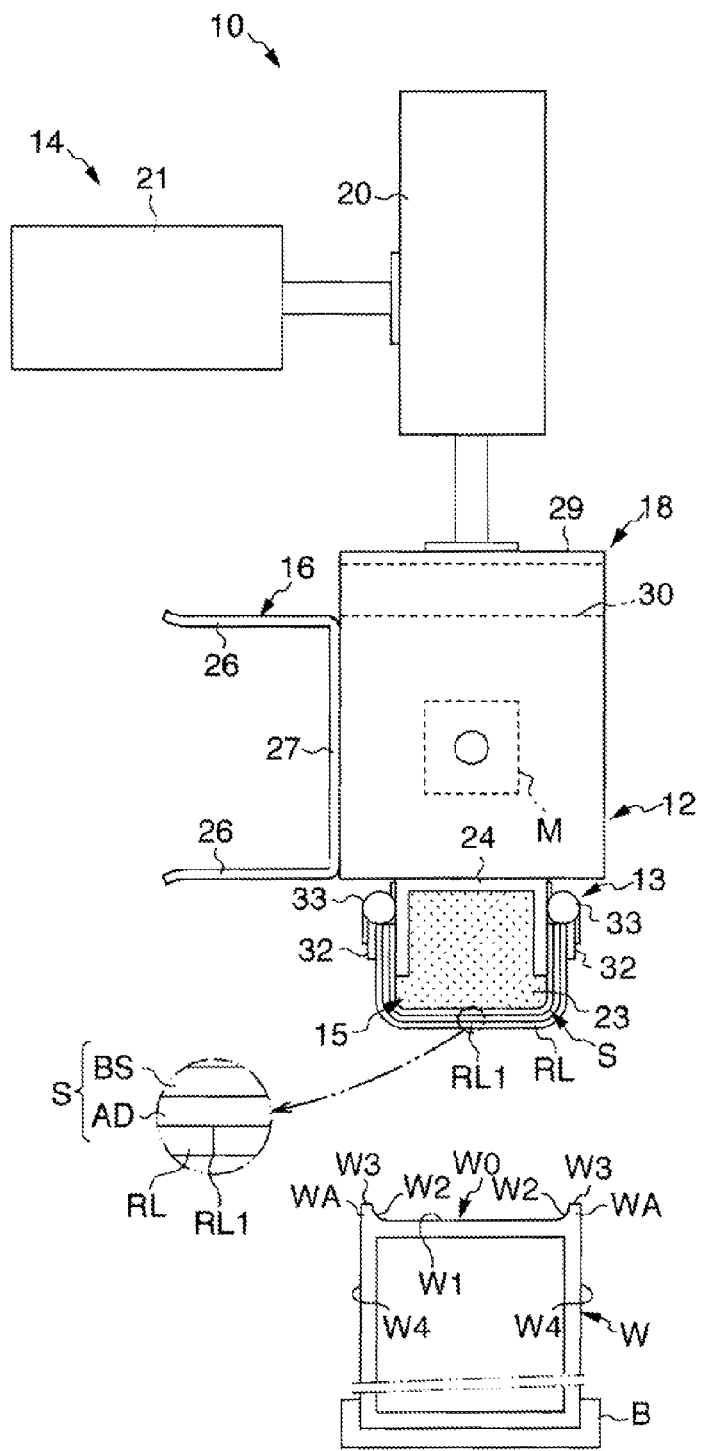
FIG. 1 is a schematic front view of a sheet sticking apparatus according to an embodiment.

Note that terms referring to directions and locations herein are based on FIG. 1 unless expressly stated. "Front" refers to the near side in FIG. 1, and on the other hand "back" refers to the depth side in FIG. 1. "Left", "right", "upper", and "lower" are also based on the view when FIG. 1 is viewed from front.

Figure 2:
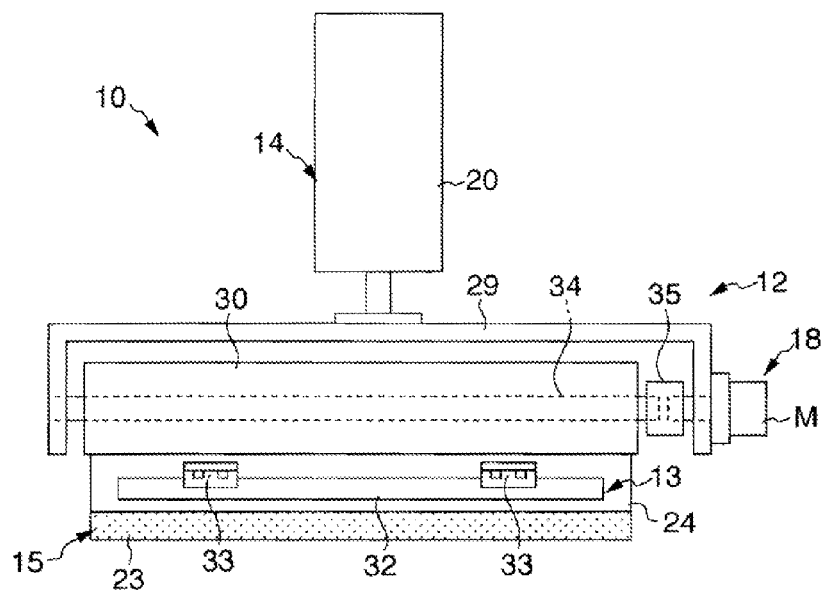
FIG. 2 is a schematic side view of the sheet sticking apparatus.
Figure 3:
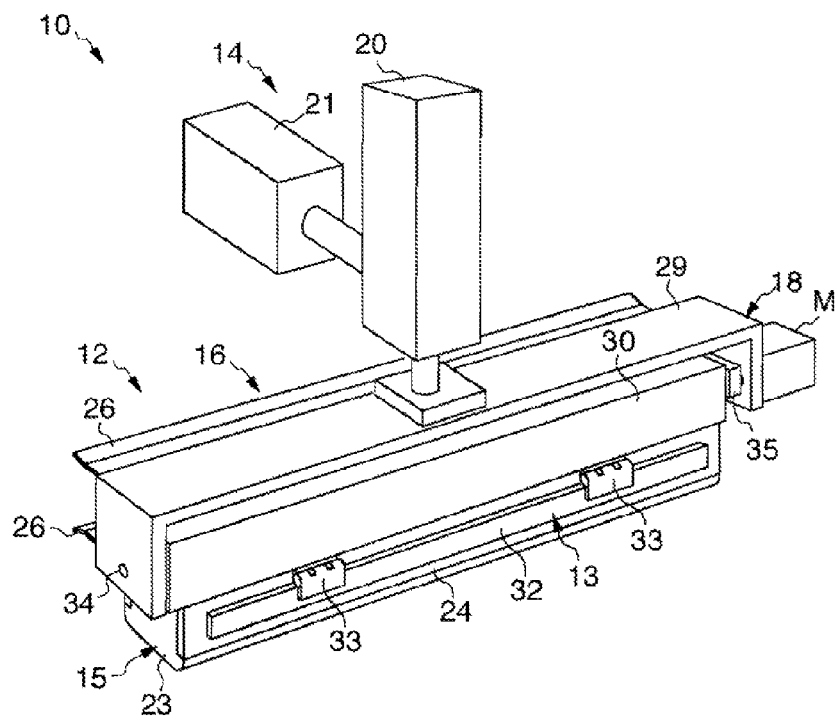
FIG. 3 is schematic perspective view of the sheet sticking apparatus.

In FIGS. 1 to 3, a sheet sticking apparatus 10 is provided above a fixing table B for fixing an adherend W. The sheet sticking apparatus 10 includes sticking means 12 that sticks an adhesive sheet S to an adherend surface W0 of the adherend W, holding means 13 that is provided on the sticking means 12 and holds the adhesive sheet S, and moving means 14 provided to be capable of moving the sticking means 12 and the adherend W relative to one another. The adhesive sheet S includes a base sheet BS, and an adhesive layer AD provided on one surface of the base sheet BS, with release liner RL being temporarily stuck on the adhesive layer AD. A slit RL1 extending in a front/back direction is formed in a central portion in a left/right direction of the release liner RL, and the release liner RL can be divided to right and left by the slit RL1.

The adherend W includes a main surface W1 located on the upper surface side, inner surfaces W2 continuously extending from both right and left sides of the main surface W1, top surfaces W3 continuously extending in respective left and right directions from the inner surfaces W2, and outer surfaces W4 continuously extending respectively downwardly from the top surfaces W3. The inner surface W2, the top surface W3, and an upper section of the outer surface W4 constitute a protrusion portion WA. In the embodiment, it is noted that the main surface W1, the inner surfaces W2, the top surfaces W3, and the outer surfaces W4 constitute the adherend surface W0.

The sticking means 12 includes a first sticking portion 15 that sticks an adhesive sheet by pressure to a first sticking surface composed of the main surface W1 and the surfaces of the protrusion portions WA, and a second sticking portion 16 that sticks portions that have not yet been stuck of the adhesive sheet S to second sticking surfaces located under the protruding upper portions WA's outside surfaces of the outer surfaces W4, and selecting means 18 that supports the first sticking means 15 and the second sticking portion 16, and can change the orientations of them.

The first sticking portion 15 includes an elastically deformable elastic member 23 made of urethane foam, rubber, synthetic resins and the like, and a U-shaped support 24 which faces downward when viewed from the front, the U-shaped support 24 supporting the elastic member 23 from above and being mounted on the selecting means 18. The width in a left/right direction of a bottom surface of the elastic member 23 is slightly smaller than the width in the left/right direction of the main surface W1, and larger than the width in the left/right direction of the top surface W3.

The second sticking portion 16 includes a pair of holding face portions 26, and a connecting face portion 27 connecting to the holding face portions 26 and mounted on the selecting means 18. The distance between inner surfaces of the holding face portions 26 is designed to have substantially the same distance as that between the outer surfaces W3 of the adherend W.

The selecting means 18 includes a U-shaped bracket 29, facing downward when viewed from the side, which is supported by an output shaft of a linear motor 20 described below, a rotary motor M provided as drive equipment and on the bracket 29, and a rotary body 30 provided rotatably by being connected to the output shaft of the rotary motor M via a coupling 35 and a shaft 34, the rotary body 30 provided with the first sticking portion 15 and the second sticking portion 16.

The holding means 13 includes plate-like pinching members 32 provided on both right and left sides of the support 24 and extending a front/back direction, hinged portions 33 attached over the pinching members 32 and provided to allow for leftward/rightward swinging of lower sections of the pinching members 32, and biasing means (not shown), including a spring, a rubber and the like, that biases such that each lower section of the pinching members 32 approaches the support 24. This enables both right and left sides of the adhesive sheet S to be held by being pinched between the support 24 and each pinching member 32. It is noted that the each pinching member 32 constitutes a creasing portion for the release liner RL, and as shown by a two-dot chain line in FIG. 4(A), the pinching member 32 allows portions of the release liner RL stuck temporarily on the held adhesive sheet S to be peeled off from the slit RL1 and folded by the lower section of the pinching member 32 to crease the release liner RL.

The moving means 14 includes a linear motor 20, acting as drive equipment, which can move the sticking means 12 in a vertical direction by supporting the selecting means 18 from above and apply a pressing force to the adhesive sheet S, and a linear motor 21, acting as drive equipment, which movably supports the linear motor 20 in a left/right direction by supporting the linear motor 20 from the left side. It is noted that the linear motor 21 is supported by a frame (not shown).

Next, a method for sticking an adhesive sheet S according to the embodiment will be described.

Firstly, as shown in FIG. 1, an adhesive sheet S, on which a release liner RL is stuck temporarily, is wound such that a base sheet BS side of the adhesive sheet S is positioned on a bottom surface side of and both right and left surface sides of the elastic member 23, and either end side of the release liner RL and the adhesive sheet S is brought to be pinched between the support 24 and the pinching member 32.

Figure 4A:
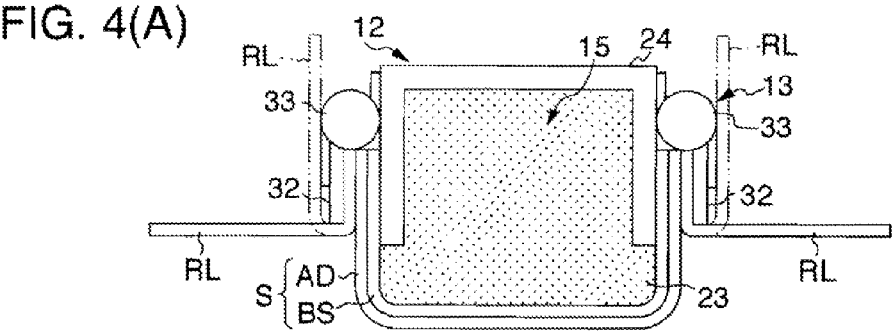
FIGS. 4(A) to (C) are explanatory views illustrating a procedure of sticking an adhesive sheet.

Next, as shown in FIG. 4(A), portions of the release liner RL are peeled off from the slit RL1, and as shown by a two-dot chain line in FIG. 4(A), each of the portions of release liner RL is creased by the lower section of the pinching member 32. In this way, the creasing of the release liner RL prevents sticking from being performed while the release liner is pinched between the adhesive sheet S and the adherend W, and can facilitate peeling off of the release liner RL later.

Figure 4B:
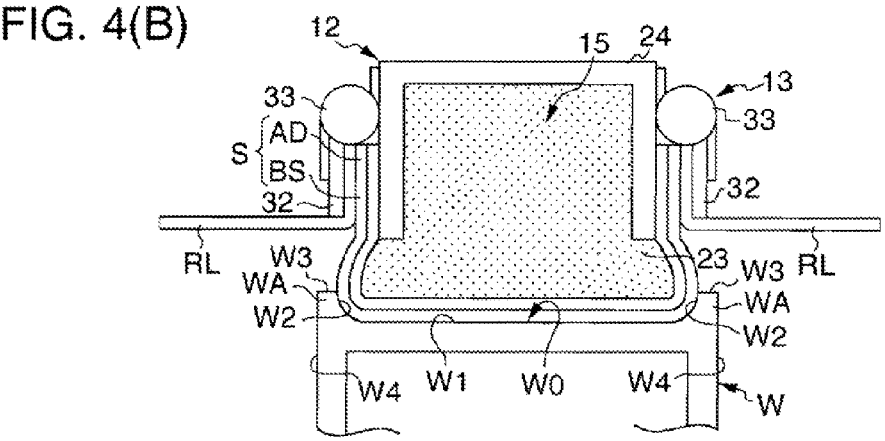

Then, the center of the held adhesive sheet S is moved to and positioned at the center of and a position immediately above the adherend surface W0 by actuating the linear motor 21, and then the sticking means 12 is lowered by actuating the linear motor 20. Owing to this lowering, the adhesive sheet S is initially pressed by the elastic member 23 against the main surface W1. Then, due to further continuous lowering, as shown in FIG. 4(B), the elastic member 23 is deformed according to the shapes of the main surface W1 and the left and right inner surfaces W2 continuously extending therefrom, so that the adhesive sheet S is stuck to the main surface W1 and the inner surfaces W2 by pressure.

Figure 4C:
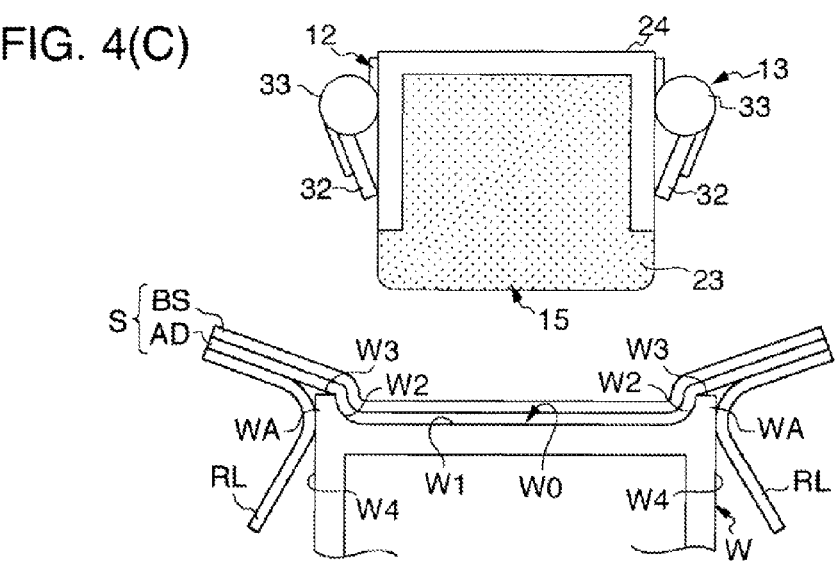

After this sticking has been finished, as shown in FIG. 4(C), the sticking means 12 is raised by actuating the linear motor 20. Owing to this raising, portions of the release liner RL and the adhesive sheet S pinched between the support 24 and the each pinching member 32 get away from therebetween, and however owing to the portions of the release liner RL stuck temporarily on the adhesive sheet S being abutting against the outer surfaces W4, the adhesive sheet S can be surely prevented from adhering to the top surfaces W3 and other areas.

Figure 5A:
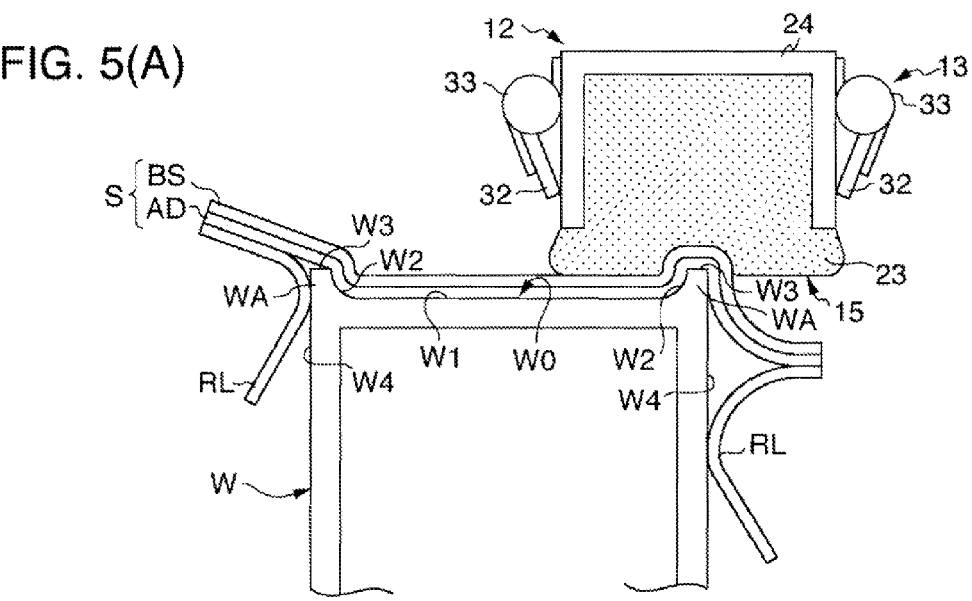
FIGS. 5(A) to (B) are explanatory views illustrating the procedure of sticking the adhesive sheet.

Next, after the sticking means 12 is moved to a position immediately above a right top surface W3 by actuating the linear motor 21, the sticking means 12 is lowered by actuating the linear motor 20. Owing to this, as shown in FIG. 5(A), the adhesive sheet S is pressed by the elastic member 23 against the top surface W3 and an upper section of the outer surfaces W4 to stick the adhesive sheet S to thereto. At this time, each of portions that have not yet been stuck of the adhesive sheet S takes a shape curved downwardly outward, and the release liner RL has a curved shape between the end of the adhesive sheet S and the outer surface W4. Then, similarly to the mentioned above, sticking is performed to the other top surface W3 and an upper section of the other outer surface W4.

Figure 5B:
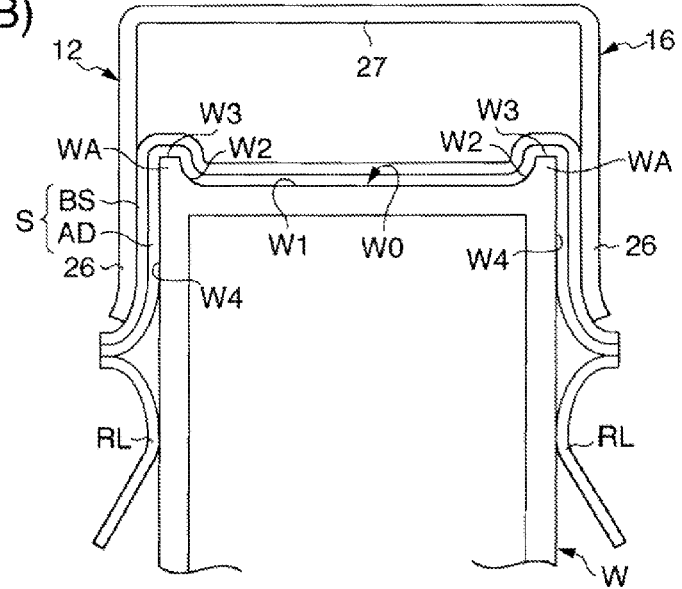
Figure 6:
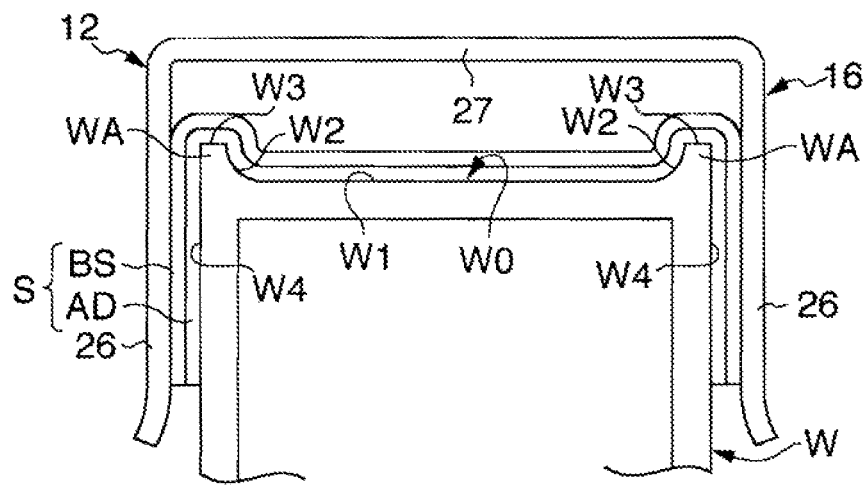
FIG. 6 is an explanatory view illustrating the procedure of sticking the adhesive sheet.
Figure 7:
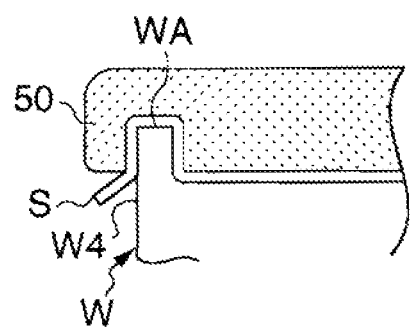
FIG. 7 is an explanatory view illustrating a conventional procedure of sticking an adhesive sheet.

Then, the sticking means 12 is raised by actuating the linear motor 20, and the rotary body 30 is rotated by the rotary motor M such that the second sticking portion 16 faces downward. Then, the sticking means 12 is moved to and positioned at a position immediately above the adherend surface W0 by actuating the linear motor 21, and then the sticking means 12 is lowered by the linear motor 20, and as shown in FIG. 5(B), portions that have not yet been stuck of the adhesive sheet S are stuck while pressed toward the lower side of each outer surface W4 by the pair of holding face portions 26. At this time, the release liner RL stuck temporarily on the adhesive sheet S are peeled off from the adhesive sheet S with progression of the sticking of the adhesive sheet S, so that the entire surface of the adhesive sheet S is stuck to the sticking surface W0, as shown in FIG. 6.

Therefore, according to this embodiment, since after sticking is finished using the first sticking portion 15, the adhesive sheet S is stuck to the outer surfaces W4 by pressure using the second sticking portion, this can prevent any portion that has not yet been stuck from being left. In addition, sticking can be performed while the release liner RL are temporarily stuck on the respective portions that have not yet been stuck in the adhesive sheet S, therefore the adhesive sheet S can be gradually stuck on the adherend. This can prevent sticking from being performed while air bubbles are trapped between the adhesive sheet S and the adherend W, and while the adhesive sheet S becomes wrinkled.

The best arrangement, method and the like for carrying out the present invention have been disclosed as described above so far. However, the present invention is not limited to the above.

That is, the present invention has been specifically illustrated and described mainly about a specific embodiment. However, it is possible for those skilled in the art to add various modifications, if necessary, to the above-described embodiment with respect to shape, location, layout and the like without departing from the technical spirit and the range of the object of the present invention.

Accordingly, the description limiting the shapes and the like disclosed above is merely illustrative to facilitate understanding of the present invention and does not limit the invention. Therefore, descriptions denoted by names of the elements in which a part or all of the limitations such as such shapes is removed are intended to be included in the present invention.

For example, the holding means 13 may be variously modified as long as the adhesive sheet S and the release liner RL can be held as mentioned before. The elastic member 23 may be provided with suction means for sucking and holding. The support 24 and the pinching members 32 may be provided with magnets for pinching by means of magnetic force.

Furthermore, the step for creasing the release liner RL may be omitted as long as sticking may be performed similarly to the aforementioned. However, the creasing has an advantage in that smooth sticking is facilitated using the second sticking portion 16.

Also, the drive equipment in the above embodiment may includes electric motors such as rotary motors, linear motors, linear driving motors, single-axis robots, articulated robots, and actuators such as air cylinders, hydraulic cylinders, rodless cylinders, and rotary cylinders, and combinations in which they are directly or indirectly combined (Some overlap with those exemplified in the embodiment).

Furthermore, although for the moving means 14 the linear motors 20 and 21 are provided as drive equipment that can move the sticking means 12 from side to side or up and down, there may be provided drive equipment that enables for positioning in a front/back direction. Moreover, the moving means 14 may be provided on the fixing table B side for fixing adherends W, or may be provided on both the sticking means 12 side and the fixing table B side.

Also, the distance between the inner surfaces of the pair of holding face portions 26 does not have to be substantially the same throughout the whole region. While the distance between the inner surfaces near the tips thereof is substantially the same distance as the distance between the outer surfaces W4, the distance between the inner surfaces may increase as going toward the connecting face portion 27. Furthermore, the pair of holding face portions 26 is not limited to the plate-like members, and may be constituted by rollers and brushes.

Moreover, the adherend W in the embodiment has protrusion portions WA at both ends of the main surface W, and however may be provided with a protrusion portion WA only at one side, and may have no protrusion portion WA.

Also, an adhesive sheet S without release liner RL stuck temporarily on the adhesive layer AD of the adhesive sheet S may be included as a target of sticking.

EXPLANATION OF REFERENCE NUMERALS

10: sheet sticking apparatus
12: sticking means
13: holding means
15: first sticking portion
16: second sticking portion
32: pinching member (creasing portion)
AD: adhesive layer
BS: base sheet
RL: release liner
Rl1: slit
S: adhesive sheet
W: adherend
W0: adherend surface
WA: protrusion portion

The invention claimed is:

1. A sheet sticking apparatus for sticking an adhesive sheet to an adherend surface having a first sticking surface and second sticking surfaces, the adhesive sheet including an adhesive layer on one surface of a base sheet, the apparatus comprising:
    holding means provided so as to be capable of holding the adhesive sheet; and sticking means that sticks the adhesive sheet to the adherend surface by pressure,
    wherein the sticking means includes a first sticking portion capable of sticking a part of the adhesive sheet held by the holding means to the first sticking surface by pressure, and a second sticking portion capable of sticking portions of the adhesive sheet that have not yet been stuck by using the first sticking portion to the second sticking surfaces by pressure,
    wherein the adhesive sheet has a release liner temporarily stuck to the adhesive layer,
    wherein the holding means is provided so as to be capable of holding the adhesive sheet in a state in which the release liner is partially peeled off, and
    wherein the second sticking portion is provided so as to be capable of sticking the adhesive sheet to the second sticking surfaces by pressure, while gradually peeling off the release liner that have been partially peeled off from the adhesive sheet.

2. The sheet sticking apparatus according to claim 1, wherein the holding means comprises creasing portions for creasing the release liner temporarily stuck to the held adhesive sheet by folding the release liner.

3. A sheet sticking method for sticking an adhesive sheet to an adherend surface having a first sticking surface and second sticking surfaces, the adhesive sheet including an adhesive layer on one surface of a base sheet, the method comprising the steps of:
    holding the adhesive sheet in a state in which a release liner, which is temporarily stuck to the adhesive layer, is partially peeled off;
    sticking a part of the held adhesive sheet to the first sticking surface by pressure; and
    sticking portions of the adhesive sheet that have not yet been stuck in the preceding step to the second sticking surfaces by pressure, while gradually peeling off the release liner that has been partially peeled off from the adhesive sheet.

4. A sheet sticking apparatus for sticking an adhesive sheet to an adherend surface having a first sticking surface and second sticking surfaces, the adhesive sheet including an adhesive layer on one surface of a base sheet, the apparatus comprising:
    holding means provided so as to be capable of holding the adhesive sheet; and sticking means that sticks the adhesive sheet to the adherend surface by pressure,
    wherein the sticking means includes a first sticking portion capable of sticking a part of the adhesive sheet held by the holding means to the first sticking surface by pressure, and a second sticking portion capable of sticking portions of the adhesive sheet that have not yet been stuck by using the first sticking portion to the second sticking surfaces by pressure,
    wherein the apparatus further comprises a selecting means which supports the first sticking portion and the second sticking portion, and
    wherein the selecting means is configured so as to change orientations of the first sticking portion and the second sticking portion relative to the adherend surface.

5. The sheet sticking apparatus according to claim 4,
    wherein the adhesive sheet has a release liner temporarily stuck to the adhesive layer, and
    wherein the holding means is provided so as to be capable of holding the adhesive sheet in a state in which the release liner is partially peeled off.

* * * * *